United States Patent
Hariu et al.

(10) Patent No.: US 8,336,968 B2
(45) Date of Patent: Dec. 25, 2012

(54) BRAKE APPARATUS FOR TWO-WHEELED VEHICLE

(75) Inventors: Jun Hariu, Saitama (JP); Koichi Ohta, Saitama (JP); Masahiro Yoshida, Saitama (JP); Fuyuki Hosakawa, Saitama (JP); Kunihiro Notsu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 565 days.

(21) Appl. No.: 11/706,191

(22) Filed: Feb. 15, 2007

(65) Prior Publication Data

US 2007/0188012 A1 Aug. 16, 2007

(30) Foreign Application Priority Data

Feb. 15, 2006 (JP) ................. 2006-038604

(51) Int. Cl.
*B60T 8/26* (2006.01)
(52) U.S. Cl. .................... 303/9.64; 188/344
(58) Field of Classification Search .............. 303/116.4, 303/137, 9.64; 188/344; 180/219, 291, 292
See application file for complete search history.

(56) References Cited

U.S. PATENT DOCUMENTS 5,273,346 A * 12/1993 Tsuchida et al. ............... 303/2

FOREIGN PATENT DOCUMENTS

| DE | 19532521 A1 | | 3/1997 |
|----|-------------|---|--------|
| DE | 10235378 A1 | | 2/2004 |
| EP | 1531104 A1 | | 5/2005 |
| GB | 2134201 A | * | 8/1984 |
| JP | 56-160246 A | | 12/1981 |
| JP | 02011448 A | * | 1/1990 |
| JP | 5-105174 A | | 4/1993 |
| JP | 2575106 Y2 | * | 6/1998 |

\* cited by examiner

*Primary Examiner* — Robert A Siconolfi
*Assistant Examiner* — Stephen Bowes
(74) *Attorney, Agent, or Firm* — Birch, Stewart, Kolasch & Birch, LLP

(57) ABSTRACT

A brake apparatus for a two-wheeled vehicle includes a hydraulic brake, which receives a hydraulic force to thereby generate a braking force, and a braking force control unit, which controls the braking force by increasing or decreasing the hydraulic pressure. The two-wheeled vehicle includes an engine disposed between a front wheel and a rear wheel. The engine includes a crankcase disposed downward thereof and a cylinder extending upwardly from a front portion of the crankcase. The braking force control unit is disposed in a space surrounded by the cylinder at a position forward thereof and the crankcase at a position downward thereof, respectively. The brake apparatus for a two-wheeled vehicle is capable of promoting enhanced maneuverability, achieving sufficient durability performance, and improving electric connection performance.

13 Claims, 4 Drawing Sheets

BRAKE APPARATUS FOR TWO-WHEELED VEHICLE

CROSS-REFERENCE TO RELATED APPLICATION

The present application claims priority under 35 U.S.C. §119 to Japanese Patent Application No. 2006-038604, filed Feb. 15, 2006, the entire contents of which are hereby incorporated by reference.

BACKGROUND OF THE INVENTION

1. Field of the Invention

The present invention relates generally to brake apparatuses for two-wheeled vehicles and, more particularly, to a brake apparatus for two-wheeled vehicles used in an antilock brake system (ABS) that brakes front and rear wheels without letting the wheels lock up.

2. Description of Background Art

An example of a known brake apparatus for two-wheeled vehicles includes a front wheel modulator disposed forward of a handlebar and a rear wheel modulator disposed forward of a rear wheel (see, for example, Japanese Patent Laid-Open No. Hei 5-105174.)

The known art disclosed in Japanese Patent Laid-Open No. Hei 5-105174, however, has the following problems.

The first problem is as follows. Relative to a weight of the entire two-wheeled vehicle, the front wheel modulator that is relatively heavy in weight is disposed forward of the handlebar and the rear wheel modulator that is again relatively heavy in weight is disposed forward of the rear wheel. Each of the front and rear wheel modulators is therefore away from the position of a center of gravity of a vehicle body. As a result, maneuverability of the vehicle is degraded because of dispersed heavy items.

The second problem is as follows. Each of the front and rear wheel modulators has an internal mechanism thereof exposed to an outside. There is therefore a concern over thermal effect of an engine particularly on the front wheel modulator. This makes it necessary to prepare a modulator that offers outstanding heat resistance.

The third problem is as follows. The two modulators are disposed away from each other at front and rear. A control unit connected electrically to each of these modulators naturally has a long wiring harness. This results in an increased cost and poor maintainability.

SUMMARY AND OBJECTS OF THE INVENTION

The present invention has been made to solve these problems and it is an object of the present invention to provide a brake apparatus for two-wheeled vehicles capable of promoting enhanced maneuverability, achieving sufficient durability performance, and improving electric connection performance.

To achieve the foregoing objects, a brake apparatus for a two-wheeled vehicle according to a first aspect of the present invention includes a hydraulic brake and a braking force control unit. The hydraulic brake receives a hydraulic force to thereby generate a braking force. The braking force control unit controls the braking force by increasing or decreasing the hydraulic pressure. The two-wheeled vehicle includes an engine disposed between a front wheel and a rear wheel. The engine includes a crankcase disposed downward thereof and a cylinder that extends upwardly from a front portion of the crankcase. Further, the braking force control unit is disposed in a space surrounded by the cylinder at a position forward thereof and the crankcase at a position downward thereof, respectively.

A brake apparatus for a two-wheeled vehicle according to a second aspect of the present invention includes a hydraulic brake and a braking force control unit. The hydraulic brake receives a hydraulic force to thereby generate a braking force. The braking force control unit controls the braking force by increasing or decreasing the hydraulic pressure. The two-wheeled vehicle includes an engine disposed between a front wheel and a rear wheel. The engine includes a crankcase disposed downward thereof and a cylinder that extends upwardly from a front portion of the crankcase. Further, the braking force control unit is disposed in a space surrounded by the crankcase at a position forward thereof and the rear wheel at a position rearward thereof, respectively.

According to a third aspect of the present invention, in addition to the arrangements according to the first or second aspect of the present invention, the braking force control unit is accommodated in a box body having a heat insulation property.

According to a fourth aspect of the present invention, in addition to the arrangements according to any of the first to third aspects of the present invention, the braking force control unit controls the braking force of the hydraulic brake disposed in the front wheel.

According to a fifth aspect of the present invention, in addition to the arrangements according to any one of the first to third aspects of the present invention, the braking force control unit controls the braking force of the hydraulic brake disposed in the rear wheel.

According to a sixth aspect of the present invention, in addition to the arrangements according to the third aspect of the present invention, the braking force control unit is supported in the box body via an elastic member included in the box body.

According to a seventh aspect of the present invention, in addition to the arrangements according to the third aspect of the present invention, the braking force control unit includes the box body supported by a vehicle body via an elastic member.

EFFECTS OF THE INVENTION

In the brake apparatus for the two-wheeled vehicle according to the first aspect of the present invention, the braking force control unit, which controls the braking force by increasing or decreasing the hydraulic pressure, is disposed in the space surrounded by the cylinder of the engine at the position forward thereof and the crankcase of the engine at the position downward thereof. Unlike the arrangement in the known art, therefore, the braking force control unit is not disposed far away from the center of gravity of the vehicle body. An inertia force that is generated during movement of the vehicle body is generated at a point with a small distance from the position of the center of gravity of the vehicle body. This enhances maneuverability. "Maneuverability" as the term is herein used means following. Specifically, if heavy articles are disposed at different parts in a vehicle, the vehicle body develops a motion in a pitch direction during acceleration or deceleration and that motion becomes large. During turning, the vehicle body is brought down to a side or pulled down, but this movement cannot be made at a fast pace. Further, when the vehicle body posture fluctuates because of bumps and indentations on road surfaces, it takes longer to bring the vehicle posture back to its original position.

In the brake apparatus for the two-wheeled vehicle according to the second aspect of the present invention, the braking force control unit, which controls the braking force by increasing or decreasing the hydraulic pressure, is disposed in the space surrounded by the crankcase of the engine at the position forward thereof and the rear wheel at the position rearward thereof. Unlike the arrangement in the known art, therefore, the braking force control unit is not disposed far away from the center of gravity of the vehicle body. The inertia force that is generated during movement of the vehicle body is generated at a point with a small distance from the position of the center of gravity of the vehicle body. This enhances maneuverability.

In the brake apparatus for the two-wheeled vehicle according to the third aspect of the present invention, the braking force control unit is accommodated in the modulator box having the heat insulation property. The braking force control unit is not, therefore, susceptible to heat generated in the engine. This eliminates the need for preparing a modulator offering high heat resistance, which contributes to a reduced cost.

In the brake apparatus for the two-wheeled vehicle according to the fourth aspect of the present invention, the braking force control unit controls the braking force of the hydraulic brake included in the front wheel. This allows the front wheel to be braked while rotating without developing a wheel lockup when the vehicle body is braked.

In the brake apparatus for the two-wheeled vehicle according to the fifth aspect of the present invention, the braking force control unit controls the braking force of the hydraulic brake included in the rear wheel. This allows the rear wheel to be braked while rotating without developing a wheel lockup when the vehicle body is braked.

In the brake apparatus for the two-wheeled vehicle according to the sixth aspect of the present invention, the braking force control unit is supported in the box body via the elastic member included in the box body. The elastic member can therefore prevent effect of heat from the engine.

In the brake apparatus for the two-wheeled vehicle according to the seventh aspect of the present invention, the braking force control unit includes the box body supported by the vehicle body via the elastic member. The elastic member, being disposed outside the box body, can be easily built largely, which facilitates improvement of shock absorbing performance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A brake apparatus for two-wheeled vehicles according to a specific embodiment to which the present invention is applied will be described in detail below with reference to the accompanying drawings.

Figure 1:
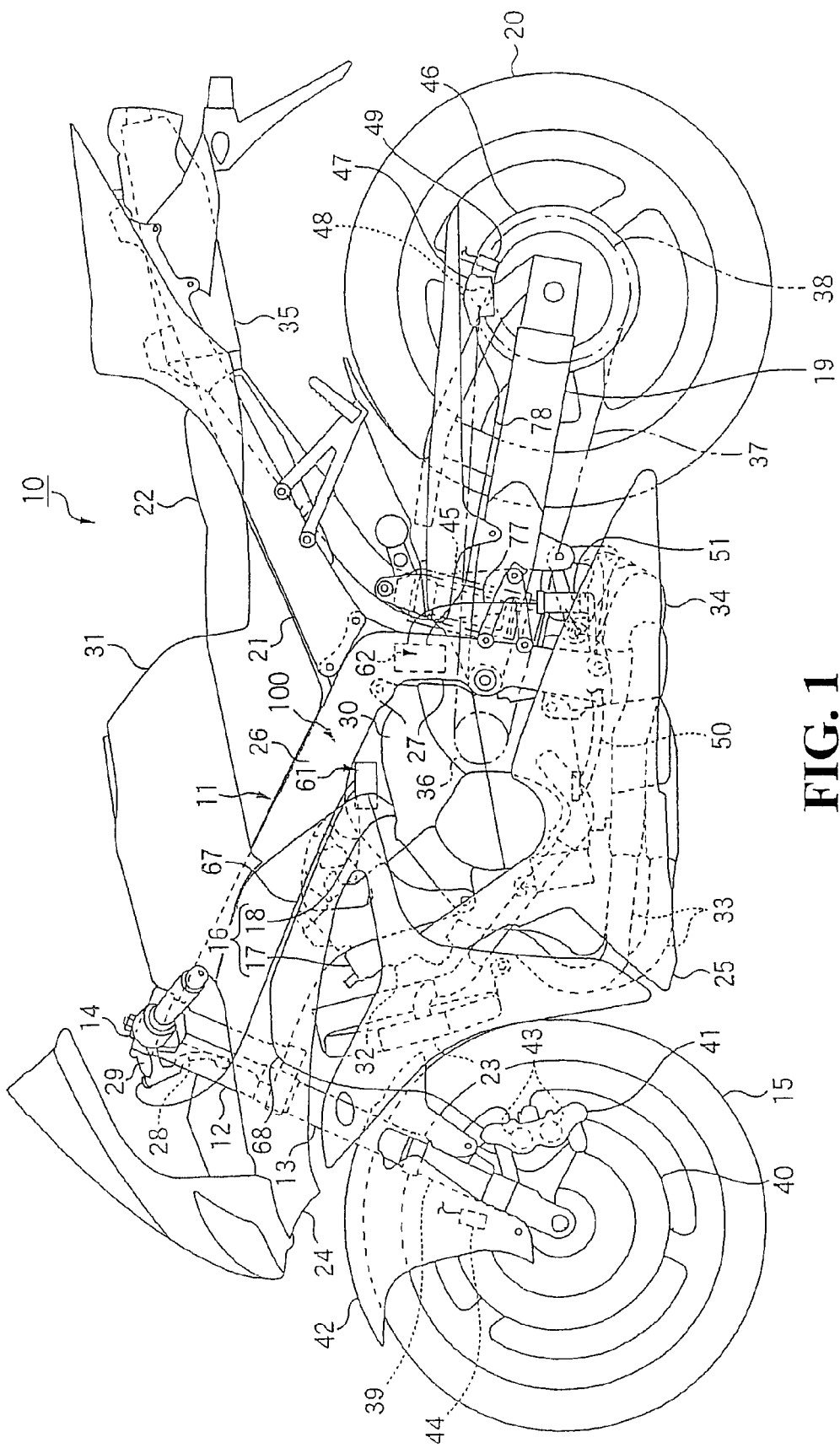
FIG. 1 is a left side elevational view showing a motorcycle including a brake apparatus for two-wheeled vehicles according to an embodiment of the present invention.
Figure 2:
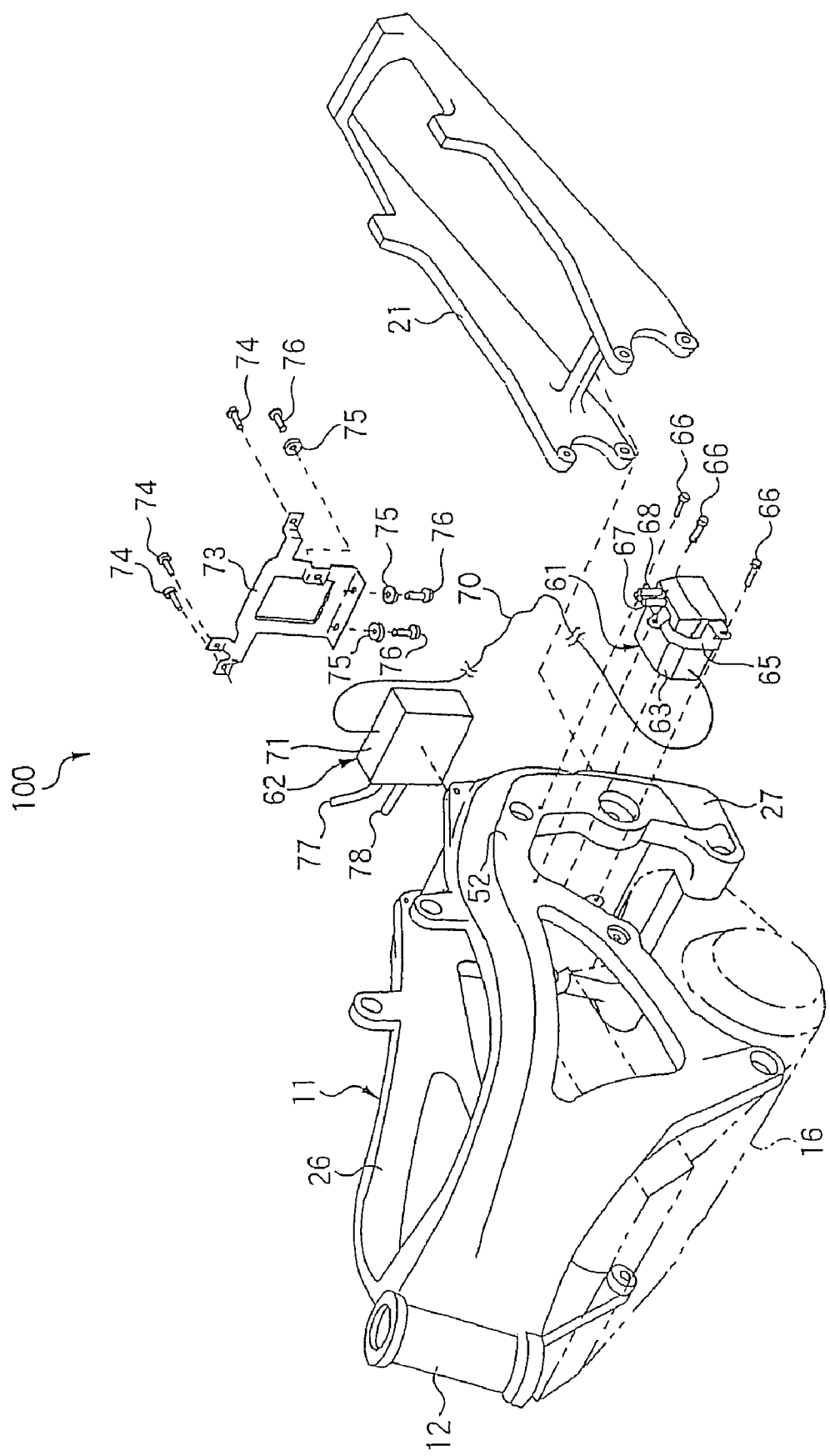
FIG. 2 is a perspective view showing a braking force control unit and parts surrounding the control unit in the motorcycle shown in FIG. 1.
Figure 3:
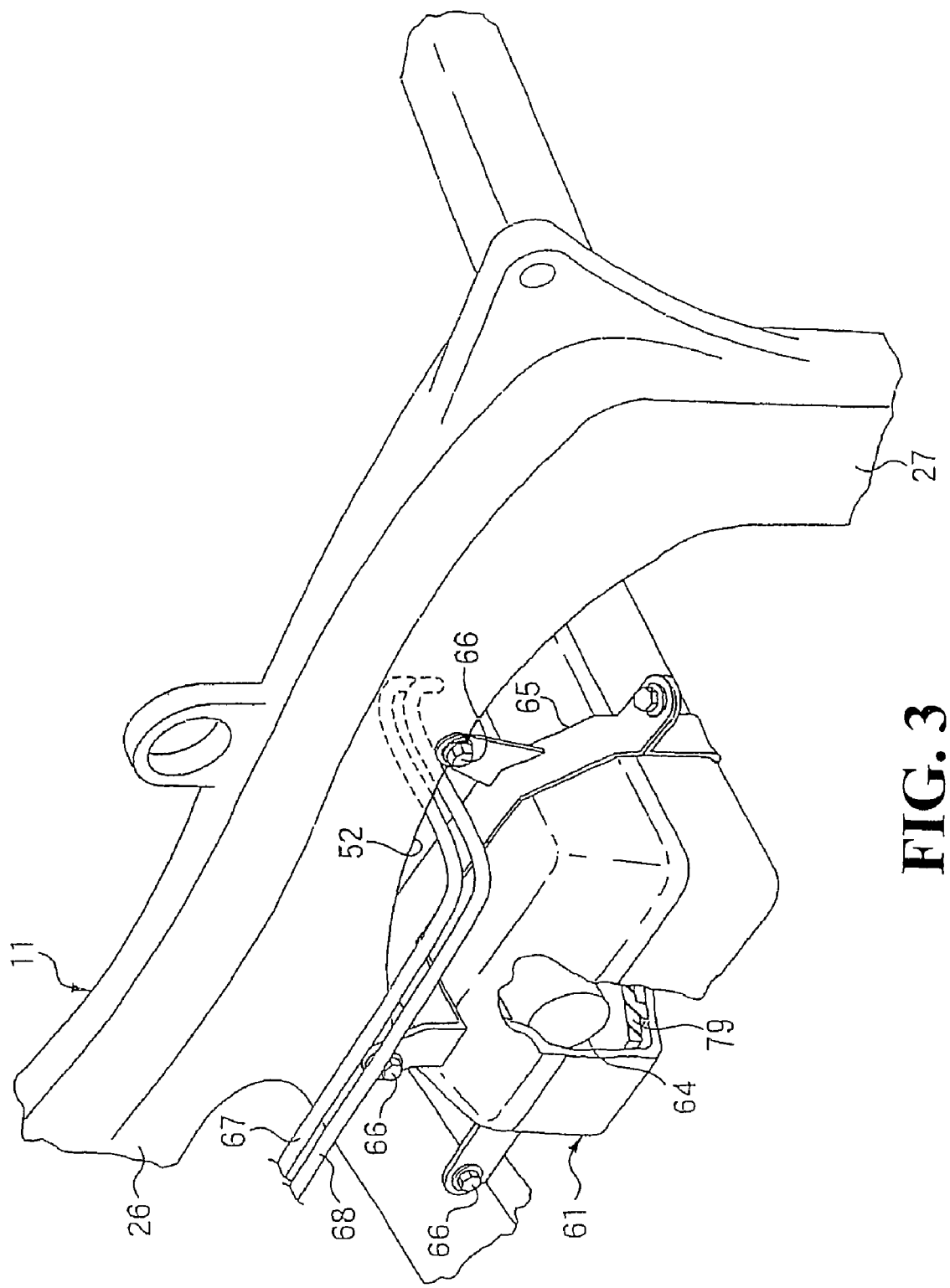
FIG. 3 is a partly cutaway perspective view showing a braking force control portion for a front wheel and parts surrounding the control portion in the braking force control unit shown in FIG. 2.
Figure 4:
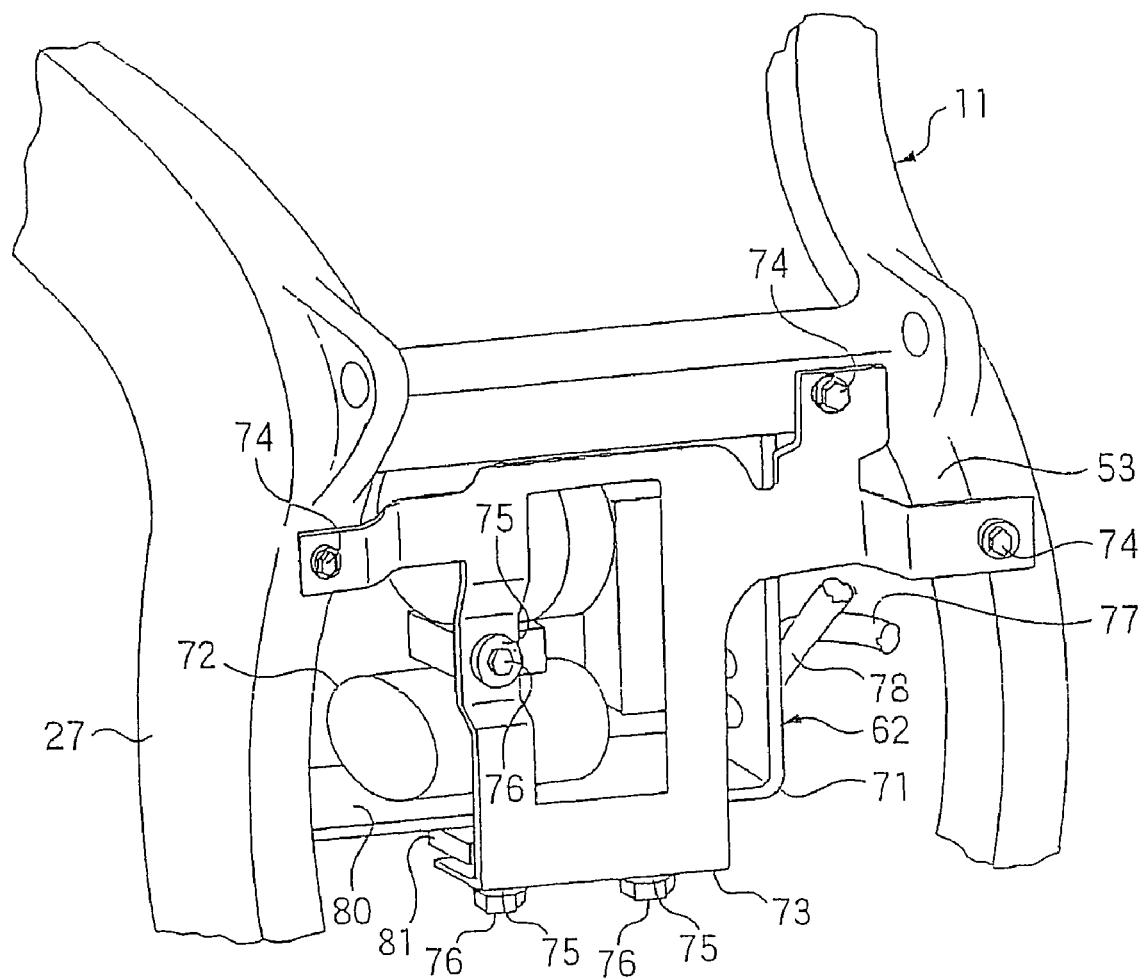
FIG. 4 is a partly cutaway perspective view showing a braking force control portion for a rear wheel and parts surrounding the control portion in the braking force control unit shown in FIG. 2.

FIGS. 1 through 4 are views showing an embodiment of the present invention. FIG. 1 is a left side elevational view showing a motorcycle including the brake apparatus for two-wheeled vehicles according to the embodiment of the present invention. FIG. 2 is a perspective view showing a braking force control unit and parts surrounding the control unit in the motorcycle shown in FIG. 1. FIG. 3 is a partly cutaway perspective view showing a braking force control portion for a front wheel and parts surrounding the control portion in the braking force control unit shown in FIG. 2. FIG. 4 is a partly cutaway perspective view showing a braking force control portion for a rear wheel and parts surrounding the control portion in the braking force control unit shown in FIG. 2. In the description that follows hereunder, "front," "rear," "right," and "left" refer to corresponding directions as viewed from a rider riding the motorcycle.

Referring to FIGS. 1 and 2, a motorcycle 10 includes, as main elements thereof, a frame 11, a front fork 13, a handlebar 14, a front wheel 15, a power unit 16, a swing arm 19, a rear wheel 20, and a tandem seat 22. The front fork 13 is attached to a head pipe 12 disposed at a front end portion of the frame 11. The handlebar 14 is connected to an upper portion of the front fork 13. The front wheel 15 is mounted to a lower portion of the front fork 13. The power unit 16 includes an engine 17 and a transmission 18 mounted on a front lower portion of the frame 11. The swing arm 19 is disposed at a rear lower portion of the frame 11. The rear wheel 20 is attached to a leading end portion of the swing arm 19. The tandem seat 22 is mounted to an upper portion in the rear of the frame 11 via a seat rail 21. The motorcycle 10 is a sports type vehicle that uses the power unit 16 to drive the rear wheel 20. The front wheel modulator 61 is fixed to a left main frame portion 26 of the frame 11 and is disposed in a space surrounded by the cylinder 32 at a position forward thereof and the crankcase 30 at a position directly downward thereof, respectively, and the rear wheel modulator 62 is located under where a forward end of the seat rail 21 is attached to the left and right sides of the center frame portion 27.

The motorcycle 10 further includes a radiator 23, a front cowl 24, and an under cowl 25. The radiator 23 is disposed at a front portion and downward of the frame 11. The front cowl 24 covers the front portion and both side portions of the frame 11. The under cowl 25 covers a lower portion of the frame 11 and a lower portion and both side portions of the power unit 16. The front cowl 24 and the under cowl 25 are formed from a lightweight FRP or other synthetic resin.

The frame 11 includes a pair of left and right main frame portions 26. The main frame portions 26, which are formed, for example, of aluminum alloy castings into substantially an inverted U-shape, extend downwardly toward the rear. The head pipe 12, of a cylindrical shape, is disposed at a front end of the main frame portions 26. In addition, the frame 11 also has a center frame portion 27 that protrudes downwardly at a rear end of the main frame portions 26.

The handlebar 14 includes a front brake lever 28 disposed on a rightward side thereof. The handlebar 14 further includes a front brake master cylinder 29 mounted thereon and connected to the front brake lever 28. The front brake master cylinder 29 stores therein brake oil not shown.

Referring to the power unit 16, the engine 17 is a water-cooled four-stroke DOHC four-cylinder engine. The transmission 18 is built into a crankcase 30. The power unit 16 is fixed to the main frame portions 26 and the center frame portion 27 of the frame 11. A fuel tank 31 is disposed above an air cleaner (not shown) in an upper portion of the power unit 16. The engine 17 includes a cylinder 32 disposed upward of the crankcase 30. An electronic fuel supply system (not shown) is connected to an intake port (not shown) in the cylinder 32. An exhaust pipe 33 connected to an exhaust port (not shown) of the cylinder 32 is connected to a main muffler 34 at a lower portion of the engine 17. The main muffler 34 is connected to a sub muffler 35. An output from the transmission 18 is used for, what is called, a chain drive. The output from the transmission 18 is transmitted from a drive sprocket 36 mounted to an output shaft (not shown) of the transmission 18 to a driven sprocket 38 fixed to the rear wheel 20 via a chain 37.

The front fork 13 has a front suspension 39 built therein. The front suspension 39 includes a coil spring and a damper. The front fork 13 also has a front caliper 41 assembled thereto. The front caliper 41 applies a braking force to a pair of front disc rotors 40 fixed to the front wheel 15. A front fender 42 is attached to an upper portion of the front wheel 15. The front caliper 41 has a twin-port caliper cylinder 43. A pulsar ring (not shown) is coaxially mounted to the front wheel 15. A front wheel speed sensor 44 for detecting a rotational speed of the front wheel 15 is assembled to an outer periphery of the pulsar ring in a non-contact fashion.

The swing arm 19 is swingably connected to the center frame portion 27 of the frame 11. Shock otherwise applied to the swing arm 19 is absorbed by a rear suspension 45 disposed between the swing arm 19 and the center frame portion 27. The rear suspension 45 includes a coil spring and a damper. Like the front wheel 15, rear disc rotors 46 are mounted to the rear wheel 20. A rear caliper 47, which applies a braking force to the rear disc rotors 46, includes a single-port caliper cylinder 48. A pulsar ring (not shown) is coaxially mounted to the rear wheel 20. A rear wheel speed sensor 49 for detecting a rotational speed of the rear wheel 20 is assembled to an outer periphery of the pulsar ring in a non-contact fashion.

A rear brake pedal 50 is depressibly journaled on a right side portion of the center frame portion 27. A rear brake master cylinder 51 connected to the rear brake pedal 50 is mounted on a side portion. Brake oil not shown is stored in the rear brake master cylinder 51.

The motorcycle 10 further includes a front wheel modulator 61 and a rear wheel modulator 62. The front wheel modulator 61, which serves as the braking force control unit for the front wheel, is disposed in a space surrounded by the cylinder 32 of the engine 17 at the front and the crankcase 30 of the engine 17 on the bottom. The rear wheel modulator 62, which serves as the braking force control unit for the rear wheel, is disposed in a space surrounded by the crankcase 30 of the engine 17 at the front and the rear wheel 20 in the rear.

The front wheel modulator 61 is incorporated in a modulator box 63 of a rectangular box body. The front wheel modulator 61 has an internal mechanism (see FIG. 3) 64 built therein. The modulator box 63 is formed from a resin or the like having a heat insulation property. The modulator box 63 is screwed to a modulator fixing portion 52 formed on a left side portion of the main frame portions 26 via a bracket 65 that is assembled so as to surround an outside of the modulator box 63. The bracket 65 is fixed in position using three bolts 66.

The front wheel modulator 61 has an inlet side brake hose 67 and an outlet side brake hose 68 protruding outwardly therefrom. The inlet side brake hose 67 is connected in fluid communication to the front brake master cylinder 29. The outlet side brake hose 68 is connected in fluid communication to the caliper cylinder 43 for the front wheel.

The rear wheel modulator 62 is incorporated in a modulator box 71 of a rectangular box body having an open rearward end. The rear wheel modulator 62 has an internal mechanism (see FIG. 4) 72 built therein. The modulator box 71 is formed from a resin or the like having a heat insulation property. The modulator box 71 is fixed to a modulator fixing portion 53 formed on a rear portion of the main frame portions 26 via a bracket 73 disposed rearwardly. The bracket 73 is fixed in position using three damper-less bolts 74 and three damper bolts 76 through which damper members 75 are passed.

The rear wheel modulator 62 has an inlet side brake hose 77 and an outlet side brake hose 78 protruding outwardly therefrom. The inlet side brake hose 77 is connected in fluid communication to the rear brake master cylinder 51. The outlet side brake hose 78 is connected in fluid communication to the caliper cylinder 48 for the rear wheel.

The front wheel modulator 61 has a controller (not shown) built therein, in addition to the internal mechanism 64. The front wheel controller incorporates electronic devices of various types and is electrically connected to a power source (not shown), the front wheel speed sensor 44, the rear wheel speed sensor 49, and the front wheel modulator 61. Constantly monitoring a front wheel speed signal (electric signal) provided by the front wheel speed sensor 44 and a rear wheel speed signal (electric signal) provided by the rear wheel speed sensor 49, the front wheel controller applies a drive signal to the front wheel modulator 61. Being integrally built into the front wheel modulator 61, the front wheel controller allows a wiring harness 70 to have a short routing length. A rear wheel controller is also built into the rear wheel modulator 62. The front wheel controller and the rear wheel controller are electrically connected to each other.

In the motorcycle 10, the front brake lever 28, the front brake master cylinder 29, the front wheel speed sensor 44, the rear brake pedal 50, the rear brake master cylinder 51, the rear wheel speed sensor 49, the front wheel modulator 61, and the rear wheel modulator 62 constitute a brake apparatus for two-wheeled vehicles 100.

Referring to FIG. 3, the front wheel modulator 61 has the internal mechanism 64, which is built into the modulator box 63, assembled on a damper member 79 formed of an elastic rubber. Accordingly, despite the arrangement, in which the front wheel modulator 61 is fixed to the modulator fixing portion 52 on the main frame portions 26 using the three bolts 66 via the bracket 65, the internal mechanism 64 is supported without being directly subject to vibration of the vehicle body. It goes without saying that the internal mechanism 64 is not directly subject to heat from the engine 17, either, since the modulator box 63 has a heat insulation property. Further, the front wheel modulator 61 is fixed to the modulator fixing portion 52 that is surrounded by the cylinder 32 of the engine 17 at the front and the crankcase 30 of the engine 17 on the bottom, so that the front wheel modulator 61 is disposed at a position near a center of gravity of the motorcycle 10.

Referring to FIG. 4, the rear wheel modulator 62 has the internal mechanism 72 built into the modulator box 71 having an opening 80 in the rear. The rear wheel modulator 62 is fixed to the modulator fixing portion 53 at the rear portion of the center frame portion 27 via the bracket 73. It is to be noted herein that the bracket 73 is fixed in position as detailed in the following. Specifically, the three damper-less bolts 74 are directly screwed into the modulator fixing portion 53. Two of the three damper bolts 76, through which the damper members 75 are passed, are screwed into a metal plate 81 fixed to the modulator box 71. The remaining one damper bolt 76 is screwed into the modulator box 71.

Accordingly, the arrangement, in which the rear wheel modulator 62 is fixed with the damper bolts 76 to the modulator fixing portion 53 of the center frame portion 27 via the bracket 73, allows the internal mechanism 72 to be supported without being directly subject to the vibration of the vehicle body. It goes without saying that the internal mechanism 72 is not directly subject to heat from the engine 17, since the modulator box 71 has a heat insulation property. Further, the rear wheel modulator 62 is fixed to the modulator fixing portion 53 that is surrounded by the crankcase 30 of the engine 17 at the front and the rear wheel in the rear, so that the rear wheel modulator 62 is disposed at a position near the center of gravity of the motorcycle 10.

In the motorcycle 10 having the arrangements as described in the foregoing, the front brake lever 28 is gripped or the rear brake pedal 50 is depressed during ordinary braking. Then a pressurized brake oil is supplied to the caliper cylinder 43 on the side of the front wheel 15 from the front brake master cylinder 29. Alternatively, a pressurized brake oil is supplied to the caliper cylinder 48 on the side of the rear wheel 20 from the rear brake master cylinder 51. This applies a braking force to the front disc rotors 40, or to the rear disc rotors 46. At this time, neither the front wheel modulator 61 nor the rear wheel modulator 62 is energized.

Unlike the foregoing situation, when the front brake lever 28 is gripped in the same manner as above while the motorcycle 10 is running, the value of a front wheel speed signal given by the front wheel speed sensor 44 may become extremely small, resulting in the speed of the front wheel 15 decreasing excessively relative to the speed of the vehicle body. At this time, the front wheel controller, which constantly monitors the above electric signal, applies a drive signal to the internal mechanism 64 of the front wheel modulator 61. This causes the front wheel modulator 61 to decrease the pressure of the brake oil in the outlet side brake hose 68 instantaneously and thereafter increase the pressure of the brake oil again. The front wheel modulator 61 executes this sequence of operations repeatedly, for example, a plurality of number of times per one second. This ensures that the front wheel 15 is braked while rotating without developing a wheel lockup.

Similarly, when the rear brake pedal 50 is depressed in the same manner as above while the motorcycle 10 is running, the value of a rear wheel speed signal given by the rear wheel speed sensor 49 may become extremely small, resulting in the speed of the rear wheel 20 decreasing excessively relative to the speed of the vehicle body. At this time, the rear wheel controller applies a drive signal to the internal mechanism 72 of the rear wheel modulator 62. This causes the rear wheel modulator 62 to decrease the pressure of the brake oil in the outlet side brake hose 78 instantaneously and thereafter increase the pressure of the brake oil again. The rear wheel modulator 62 executes this sequence of operations repeatedly, for example, a plurality of number of times per 1 second. This ensures the rear wheel 20 is braked while rotating without developing a wheel lockup.

In accordance with the brake apparatus for two-wheeled vehicles 100 as described in the foregoing, the front wheel modulator 61, which controls the braking force by increasing or decreasing the brake oil pressure, is disposed in the space surrounded by the cylinder 32 of the engine 17 at the front and the crankcase 30 of the engine 17 on the bottom. Specifically, the front wheel modulator 61 is disposed in a position near the center of gravity of the vehicle body surrounding the engine. Unlike the arrangement in the known art, therefore, the front wheel modulator 61 is not disposed far away from the center of gravity of the vehicle body. An inertia force that is generated during movement of the vehicle body is generated at a point with a small distance from the position of the center of gravity of the vehicle body. This enhances maneuverability.

In addition, in the brake apparatus for two-wheeled vehicles 100, the rear wheel modulator 62, which controls the braking force by increasing or decreasing the brake oil pressure, is disposed in the space surrounded by the crankcase 30 of the engine 17 at the front and the rear wheel 20 in the rear. Specifically, the rear wheel modulator 62 is disposed in a position near the center of gravity of the vehicle body surrounding the engine 17. Unlike the arrangement in the known art, therefore, the rear wheel modulator 62 is not disposed far away from the center of gravity of the vehicle body. The inertia force that is generated during movement of the vehicle body is generated at a point with a small distance from the position of the center of gravity of the vehicle body. This enhances maneuverability.

In the brake apparatus for two-wheeled vehicles 100 according to the embodiment of the present invention, the front wheel modulator 61 and the rear wheel modulator 62 are accommodated in the modulator boxes 63, 71 having the heat insulation property, respectively. The modulators 61, 62 are not, therefore, susceptible to heat generated in the engine 17. This eliminates the need for preparing a modulator offering high heat resistance, which contributes to a reduced cost. Further, performance can be ensured even if a modulator having low heat resistance is used.

In the brake apparatus for two-wheeled vehicles 100 according to the embodiment of the present invention, the front wheel modulator 61 controls the braking force of the caliper cylinder 43 included in the front wheel 15. This allows the front wheel 15 to be braked while rotating without developing a wheel lockup when the vehicle body is braked.

In the brake apparatus for two-wheeled vehicles 100 according to the embodiment of the present invention, the rear wheel modulator 62 controls the braking force of the caliper cylinder 48 included in the rear wheel 20. This allows the rear wheel 20 to be braked while rotating without developing a wheel lockup when the vehicle body is braked.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake apparatus for a two-wheeled vehicle, comprising:
    a hydraulic brake receiving a hydraulic force to thereby generate a braking force;
    a first braking force control unit controlling the braking force of the hydraulic brake disposed in the front wheel by increasing or decreasing the hydraulic pressure, the two-wheeled vehicle including an engine disposed between a front wheel and a rear wheel, the engine including a crankcase disposed downward thereof and a cylinder extending upwardly from a front portion of the crankcase; and a second braking force control unit controlling the braking force of the hydraulic brake disposed in the rear wheel, wherein the first braking force control unit is fixed to one of a left or a right main frame portion of a body frame of the vehicle and disposed in a space surrounded by the cylinder at a position forward thereof and the crankcase at a position directly downward thereof, respectively, and the second braking force control unit is located under where a forward end of a seat rail is attached to the left and right center frame members.

2. The brake apparatus for the two-wheeled vehicle according to claim 1, wherein the first braking force control unit is supported in a first rectangular box body via an elastic member included in the rectangular box body.

3. The brake apparatus for the two-wheeled vehicle according to claim 1, wherein the first braking force control unit is disposed in a position near a center of gravity of the vehicle.

4. The brake apparatus for the two-wheeled vehicle according to claim 1, wherein the first braking force control unit includes a first rectangular box body supported by the body frame via an elastic member.

5. The brake apparatus for the two-wheeled vehicle according to claim 1, wherein the first braking force control unit is accommodated in a first rectangular box body having a heat insulation property.

6. The brake apparatus for the two-wheeled vehicle according to claim 1, wherein the first braking force control unit is located under the fuel tank and directly above a drive sprocket.

7. A brake apparatus for a two-wheeled vehicle, comprising:

a hydraulic brake receiving a hydraulic force to thereby generate a braking force; and a first braking force control unit controlling the braking force of the hydraulic brake disposed in a front wheel of the vehicle by increasing or decreasing the hydraulic pressure, the two-wheeled vehicle including an engine disposed between the front wheel and a rear wheel of the vehicle, the engine including a crankcase disposed downward thereof and a cylinder extending upwardly from a front portion of the crankcase, and a second braking force control unit, which is separate from the first braking force control unit, controls the braking force of the hydraulic brake disposed in the rear wheel, wherein the first braking force control unit is disposed near a center of gravity of a body frame of the vehicle in a space surrounded by the crankcase at a position forward thereof and the rear wheel at a position rearward thereof, respectively, wherein the second braking force control unit is disposed rearwardly of the first braking force control unit, and is fixed to rear portions of left and right center frame portions of the body frame of the vehicle which is a position located directly under a position where a forward end of a seat rail is attached to the left and right center frame members.

8. The brake apparatus for the two-wheeled vehicle according to claim 7, wherein the first braking force control unit includes a first rectangular box body supported by the body frame via an elastic member, and the second braking force control unit is supported in a second box body disposed rearwardly with respect to a center of gravity of a body frame of the vehicle.

9. The brake apparatus for the two-wheeled vehicle according to claim 8, wherein the first braking force control unit is disposed in a position near a center of gravity of the body frame.

10. The brake apparatus for the two-wheeled vehicle according to claim 7, wherein the first braking force control unit includes a first rectangular box body supported by the body frame via an elastic member.

11. The brake apparatus for the two-wheeled vehicle according to claim 7, wherein the first braking force control unit is accommodated in a first rectangular box body having a heat insulation property.

12. A brake apparatus for a two-wheeled vehicle, comprising:

a hydraulic brake receiving a hydraulic force to thereby generate a braking force; and a first braking force control unit controlling the braking force of the hydraulic brake disposed in a front wheel of the vehicle by increasing or decreasing the hydraulic pressure, the two-wheeled vehicle including an engine disposed between the front wheel and a rear wheel of the vehicle, the engine including a crankcase disposed downward thereof and a cylinder extending upwardly from a front portion of the crankcase, and a second braking force control unit, controlling the braking force of the hydraulic brake disposed in the rear wheel, the second braking force control unit being disposed separately from the first braking force control unit, wherein the first braking force control unit is disposed in a space surrounded by the crankcase at a position forward thereof and the rear wheel at a position rearward thereof, respectively, and the second braking force control unit is fixed to rear portions of a pair of left and right center frame portions of a body frame of the vehicle, and is disposed midway between the left and right center frame portions, and wherein the first braking force control unit is located under the fuel tank and directly above a drive sprocket and includes a rectangular box body supported by the body frame via an elastic member.

13. The brake apparatus for the two-wheeled vehicle according to claim 12, wherein the second braking force control unit is located under where a forward end of a seat rail is attached to the left and right center frame members.

* * * * *